(No Model.)
R. M. BECK.
HEAD BLOCK FOR SAW MILLS.
No. 260,524. Patented July 4, 1882.
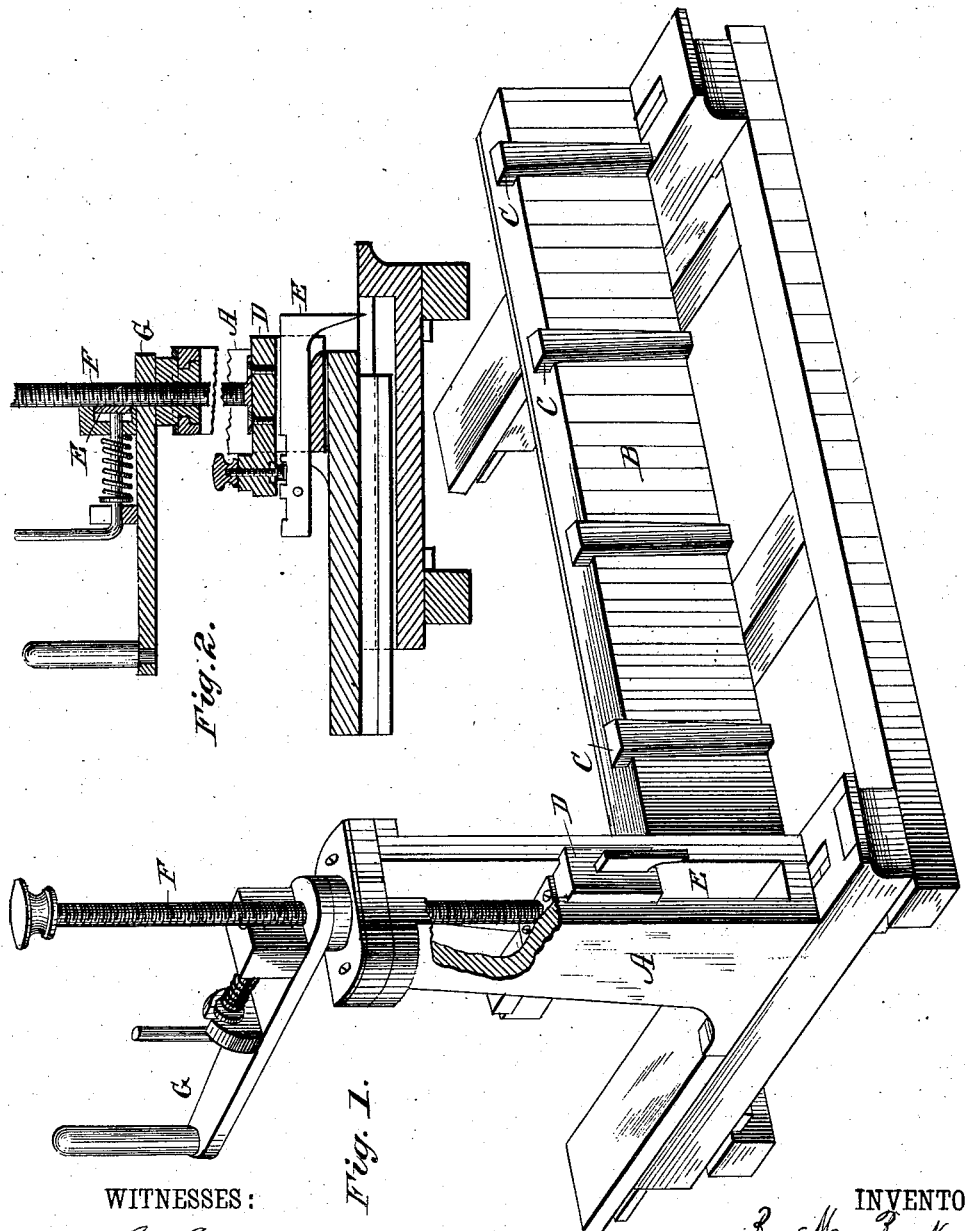
WITNESSES:
INVENTOR:
BY
ATTORNEYS.

UNITED STATES PATENT OFFICE.

ROBERT M. BECK, OF WESTMINSTER, MARYLAND.

HEAD-BLOCK FOR SAW-MILLS.

SPECIFICATION forming part of Letters Patent No. 260,524, dated July 4, 1882.

Application filed April 8, 1882. (No model.)

*To all whom it may concern:*

Be it known that I, ROBERT M. BECK, of Westminster, in the county of Carroll and State of Maryland, have invented a new and useful Improvement in Head-Blocks for Saw-Mills, of which the following is a full, clear, and exact description, reference being had to the annexed drawings, forming part of this specification.

This invention consists of certain improvements relating to the log-beam and log-dog of a saw-mill, which will be hereinafter fully described.

In the accompanying drawings, Figure 1 is a perspective view of my improved log-beam and dogging device, and Fig. 2 is a sectional view of the dogging device.

The standard A is secured to the end of the log-beam B and forms a part thereof. At suitable intervals the log-beam is provided with vertical recesses, in which fending-strips C are dovetailed to form bearing-surfaces for the log. As these strips become worn from use they may be reduced to keep their bearing-surfaces level; or new strips may easily be substituted for the old ones.

The standard A is formed of two parallel uprights, which constitute a guide for the sliding block D, in which the dog E is secured. The block D is attached to a threaded rod, F, which projects through a cross piece or pieces connecting the standards at the top, and is provided with a knob or handle, by which the dog and sliding block are to be lifted. A crank, G, which is supported in the said cross-piece, and through which the rod passes, is provided with a spring-actuated block, H, having a concave threaded surface, which is made to engage with the threaded rod and hold it in a given position. With this construction the rod drops with the block D and the dog, and the increased weight serves to force the dog into the log, while the operation of the crank, with the block H in contact with the rod, will serve to force the dog deeper into the log, if necessary, or to withdraw it therefrom.

I am aware that a revolving threaded post having a dog which may be moved up or down the same by hand has been used; but owing to the fact that the dog cannot be set and dropped with sufficient force to enter the log, but must be moved by hand, and then forced into the log by turning a crank secured to the post, it is manifest that my invention is adapted to require less time and labor in its operation. The connection of the log-beam with the standard in my invention gives great strength to the standard and serves to throw upon the head-block any excessive strain that might be produced upon the dog by the action of the saw.

In constructing the log-beam with the fending-strips the latter may be sawed to a uniform level by adjusting the beam toward the saw sufficiently to make the proper reduction on the strips, and in this manner also the strips may be reduced to make their surfaces true after wear.

The dog is made adjustable in the block D, so that it may be moved toward or from the log-beam in the usual manner.

Having thus described my invention, what I claim, and desire to secure by Letters Patent, is—

1. The combination of the slotted standard, the dog arranged therein, the threaded rod, rigidly connected at its lower end to the dog and adapted to fall therewith by force of gravity, and the crank adapted to rotate in a bearing formed in the standard, and having means for engaging at will with the rod to force the dog into the log, substantially as shown and described.

2. The combination, with the standard supporting the dog, of the log-beam forming a part thereof, and having wooden fending-strips vertically dovetailed therein at suitable intervals apart, substantially as shown and described, whereby the bearing-surface of the log-beam may be kept even by reducing the strips with the saw when worn, as set forth.

ROBT. M. BECK.

Witnesses:
A. G. LYNE,
SOLON C. KEMON.